United States Patent Office 3,508,088
Patented Apr. 21, 1970

3,508,088
LINEAR INDUCTION MOTOR
Anthony W. Davey, Long Whatton, England, assignor to Herbert Morris Limited, Loughborough, England, a company of Great Britain
Filed Sept. 14, 1967, Ser. No. 667,804
Claims priority, application Great Britain, Sept. 26, 1966, 43,578/66
Int. Cl. H02k 41/02
U.S. Cl. 310—13             3 Claims

ABSTRACT OF THE DISCLOSURE

A linear induction motor driving unit for a travelling crane in which the moving member is mounted on a crab or trolley and arranged in a circle or a segment of a circle separated by an air gap from the stationary member.

---

This invention relates to improvements in linear induction motors particularly to such motors for the operation of overhead travelling cranes or lifts.

According to the invention a driving unit for an overhead travelling crane or lift comprises a moving member mounted on a crab or trolley or wheelbox, the magnetic system of the moving member being arranged as a segment of a circle separated by an air gap from the stationary member mounted on the crane whereby when AC power is applied to the moving member this latter travels along the stationary member.

The invention will be described with reference to the accompanying drawings.

Figure 1:
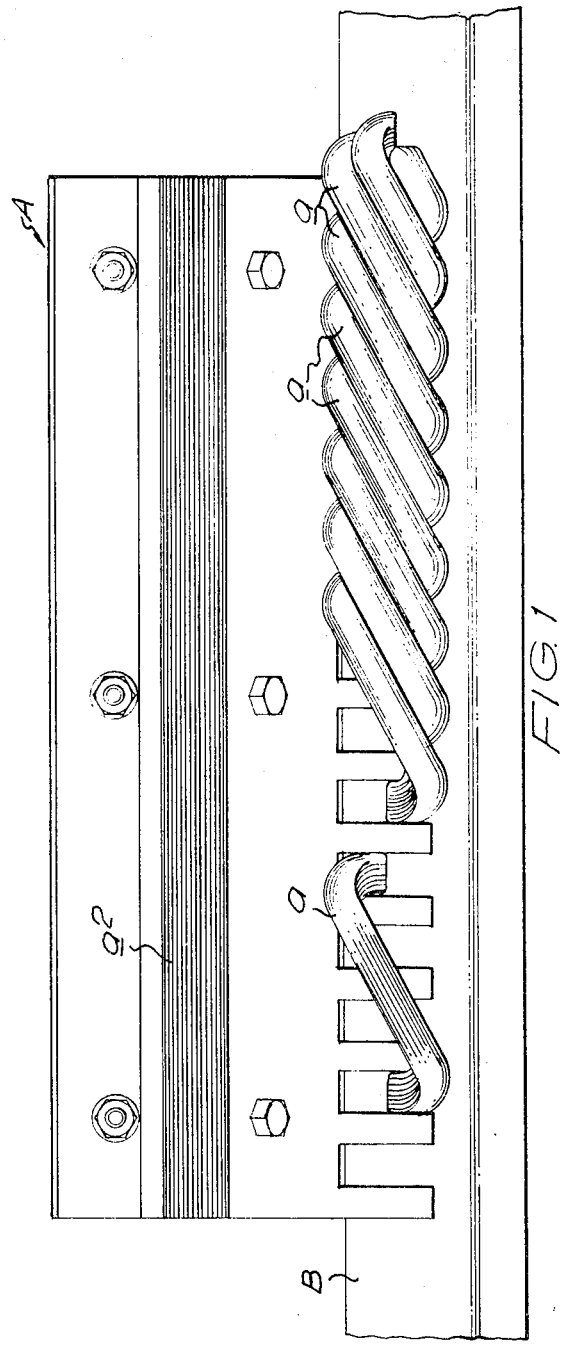
FIG. 1 is a side elevation of one construction of linear motor in which the laminated stator is sub-divided into three magnetic systems arranged in a segment of a circle, the centre portion remaining vertical and each outside portion being angled in relation to the centre portion.
Figure 2:
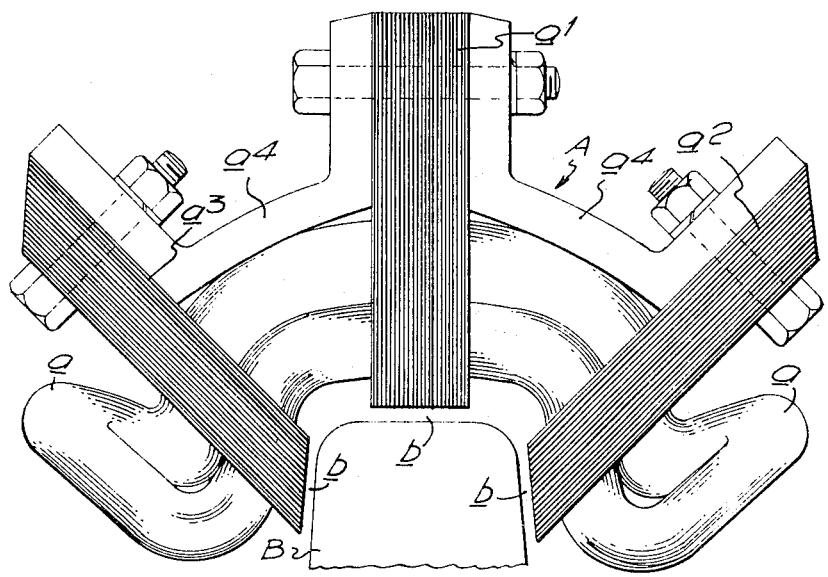
FIG. 2 is an end elevation of FIG. 1.

The moving member A of a linear inductor motor is mounted on the crab or trolley or wheel box of a crane and as shown in FIGURES 1 and 2 comprises a winding $a$ and laminated stator assembled as three magnetic structures or stacks $a^1$, $a^2$ and $a^3$ arranged in a segment of a circle. The center stack is arranged vertically and each of the outer stacks is angled in relation to the center stack. The stacks are bolted to steel support pieces $a^4$.

The crab or trolley is carried on wheels travelling over rails on the crane, one or more of the rails B forming the stationary members of the motor with the faces of the three stacks $a^1$, $a^2$, and $a^3$, of the moving member positioned adjacent the top and sides of the rail and separated therefrom by air gaps $b$.

The steel support pieces $a^4$ may be dimensioned to suit the sections used for the running tracks of cranes.

By the application of a two or three phase AC power supply to the winding $a$, a horizontal force is applied causing the crab or trolley or wheelbox to travel along the rails.

Employing a segment moving coil construction as described gives increased tractive effort and is particularly advantageous with top running crabs or trolleys.

What I claim is:

1. A linear induction motor driving unit for a travelling crane or like apparatus comprising a stationary member mounted on said apparatus, a moving member adapted to be mounted on a movable part of said apparatus and extending across the top and sides of said stationary member and having a magnetic system sub-divided into three laterally arranged magnetic structures, each separated from said stationary member by similar air gaps whereby, when alternating current power is applied to energize said magnetic system, said moving member moves along said stationary member.

2. In the linear induction motor defined in claim 1, said magnetic structures being arranged substantially on a segment of circle.

3. In the linear induction motor defined in claim 1, said magnetic system comprising a generally vertical center structure and two angularly related outer structures cooperating respectively with the top and opposite sides of said stationary member.

References Cited

UNITED STATES PATENTS

| | | | |
|---|---|---|---|
| 2,337,430 | 12/1943 | Trombetta | 310—13 |
| 3,155,851 | 11/1964 | Francis | 310—13 |
| 3,218,489 | 11/1965 | Sadler | 310—13 |
| 3,333,124 | 7/1967 | Francis et al. | 310—13 |

FOREIGN PATENTS

| | | |
|---|---|---|
| 230,778 | 4/1959 | Australia. |
| 760,521 | 6/1967 | Canada. |

J D MILLER, Primary Examiner

D. F. DUGGAW, Assistant Examiner